United States Patent
Freitas et al.

[11] Patent Number: 5,921,754
[45] Date of Patent: Jul. 13, 1999

[54] COMPOSITE TURBINE ROTOR

[75] Inventors: Glenn Freitas, Foxborough; William J. Hurley, Jr., Belmont; Kevin Keough, Canton; Richard Terrazzano, Salem; Brian Tweed, Dracut; Joseph Boyce, Norwell, all of Mass.

[73] Assignee: Foster-Miller, Inc., Waltham, Mass.

[21] Appl. No.: 08/703,029

[22] Filed: Aug. 26, 1996

[51] Int. Cl.⁶ ............... B63H 1/26; B64C 11/16; B29D 28/00
[52] U.S. Cl. ............... 416/230; 264/103; 264/258
[58] Field of Search ............... 416/230; 264/103, 264/258, 263, 273, 279.1; 156/168, 172

[56] References Cited

U.S. PATENT DOCUMENTS

| | | | |
|---|---|---|---|
| 2,857,094 | 10/1958 | Erwin | 416/230 |
| 3,403,844 | 10/1968 | Stoffer | 416/230 |
| 3,632,460 | 1/1972 | Palfreyman et al. | 156/175 |
| 3,758,232 | 9/1973 | Wallett | 416/230 X |
| 3,844,727 | 10/1974 | Copley et al. | 416/230 X |
| 4,098,559 | 7/1978 | Price | 416/230 |
| 4,354,804 | 10/1982 | Cruzen | 416/230 |
| 4,363,602 | 12/1982 | Martin | 416/230 |
| 4,464,097 | 8/1984 | Schultz | 416/230 |
| 4,576,770 | 3/1986 | Schultz | 264/103 |
| 4,589,176 | 5/1986 | Rosman et al. | 416/230 X |
| 4,676,722 | 6/1987 | Marchal et al. | 416/230 X |
| 4,786,347 | 11/1988 | Angus | 416/230 X |
| 4,826,645 | 5/1989 | Angus | 416/230 X |
| 5,273,401 | 12/1993 | Griffin | 416/230 X |
| 5,458,465 | 10/1995 | von Wieser et al. | |

*Primary Examiner*—John E. Ryznic
*Attorney, Agent, or Firm*—Iandiorio & Teska

[57] ABSTRACT

A method of manufacturing a composite turbine rotor in which blade coupons are fabricated from flat braided fabrics that have extending axial fibers. The extending axial fibers are then woven between the plies of polar woven fabric which make up the body of the rotor. This preform assembly is then impregnated with resin and cured. The blade coupons make up the blades of the rotor and can be made to have an airfoil shape, a curved shape, or a twisted shape by the use of blade formation tools designed for forming the rotor preform.

26 Claims, 11 Drawing Sheets

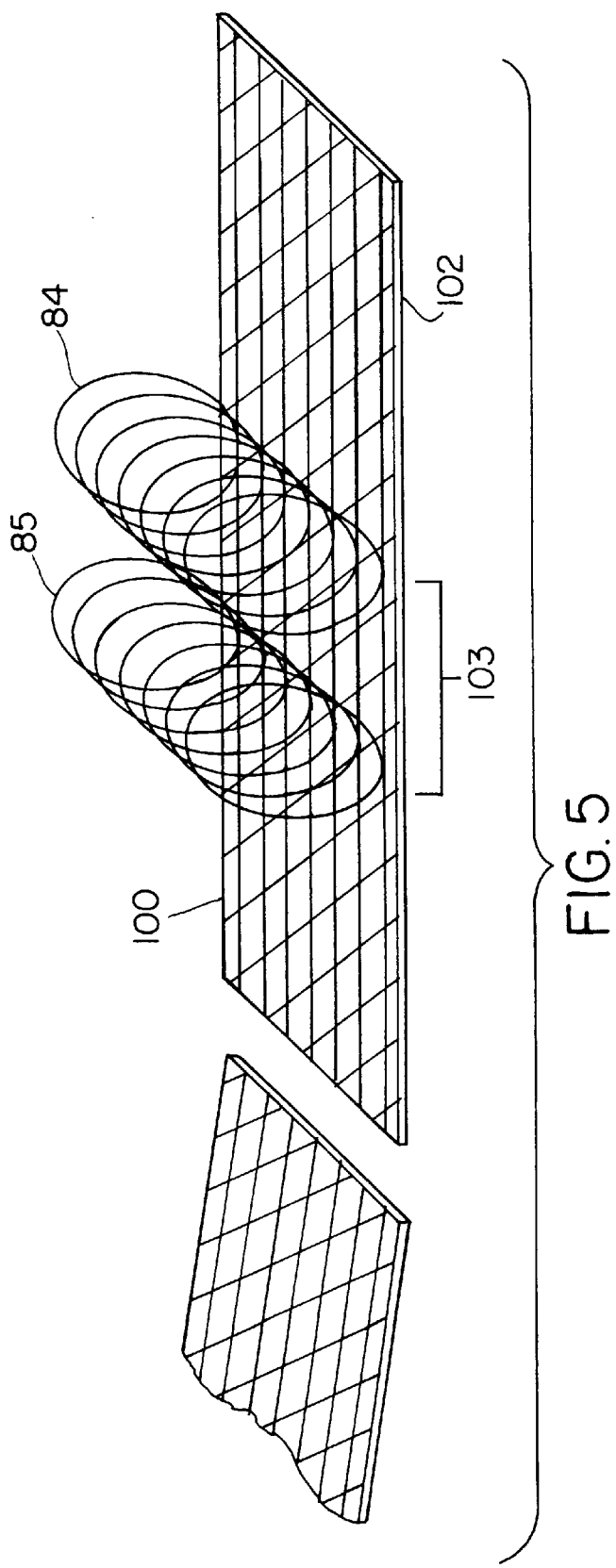
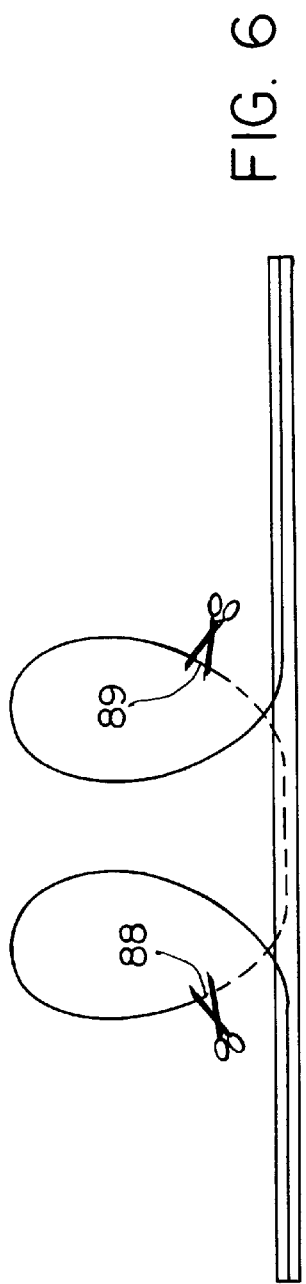

COMPOSITE TURBINE ROTOR

GOVERNMENT LICENSE RIGHTS

This invention was conceived/reduced to practice with the use of U.S. Government funds (contract No. F 33615-95-C-2370 with the U.S. Air Force). The U.S. Government has certain rights in the subject invention.

FIELD OF INVENTION

This invention relates to a turbine rotor formed of composite materials and a method of manufacturing such a composite turbine rotor.

BACKGROUND OF INVENTION

Polymer matrix composites, often comprising layers or plies of fabric impregnated with a resin, are a preferred material for aircraft parts because of their high strength to weight ratio. One problem with composite parts, however, is that it is difficult to form complicated and intricate shapes from flat plies of fabric. For example, a structurally sound and uniform turbine rotor including a rotor body and a number of rotor blades spaced around the perimeter of the rotor body is difficult to manufacture using plies of fabric. Unlike molding operations suitable for metal alloys, the plies of fabric used to form composite parts cannot be efficiently configured in the shape of a rotor. It is also very difficult to form airfoil shaped blades and blades with sufficient structural integrity having a twist or sweep. Attaching the blades to the rotor body, however, is probably the most difficult step in manufacturing a composite rotor owing to the fact that the joint between the blades and the rotor body is often weak.

SUMMARY OF INVENTION

It is therefore an object of this invention to provide a method of manufacturing a composite turbine rotor.

It is a further object of this invention to provide a composite turbine rotor which is light weight and of a very high strength.

It is a further object of this invention to provide a method of manufacturing a composite turbine rotor in which the rotor blades are not just attached to the rotor body but interwoven with the rotor body thereby greatly increasing the strength of the rotor blade hub joints.

It is a further object of this invention to provide such a method of manufacturing a composite turbine rotor which is cost effective and which lends itself to automation.

It is a further object of this invention to provide a molding tool for efficient and effective layup and molding of a composite turbine rotor.

It is a further object of this invention to provide a methodology of manufacturing any composite component having fins or blades extending from a main body.

It is a further object of this invention to provide a composite rotor with blades which are airfoil shaped and/or have a twist, and/or have a sweep.

This invention results from the realization that a strong, light weight, and impact resistant turbine rotor can be efficiently manufactured from composite materials if the blades of the turbine are formed of adjoining U-shaped flat triaxial braids having extending axial fibers which are then interwoven between the plies of the turbine body and from the further realization that the blades can be formed to have sweep if the extending axial fibers are offset slightly from one ply to another along the vertical axis of the rotor body. The blades can be manufactured to have a twist by using blade formation tooling members which form twisted blades during molding. Airfoil shaped blades are formed by selective use of different size axial fibers and unique blade formation tooling members which mold the blades into an airfoil shape.

This invention features a method of manufacturing a composite turbine rotor. A number of blade coupons are constructed such that the axial fibers of each coupon are left extending. These blade coupons are then placed side by side to form rotor blades and a stack of polar plies are assembled which will form the rotor body. The extending fibers of each blade coupon are woven between successive plies in a stack to form a rotor preform which is then molded and cured into the final composite turbine rotor component.

Blades with a sweep are formed by offsetting the extending fibers of each blade coupon with respect to the vertical axis of the stack of plies. Blade coupons typically include axial and biased fibers in a form of a flat braided fabric. During the weaving operation, one section of the flat braid has the axial fibers raised out of the plane of the braid. These raised axial fibers are then cut to form the extending fibers for each blade coupon. This flat braided fabric is then bent into U-shaped blade coupons. The U-shape blade coupons are placed adjacent to each other around the perimeter of the rotor and each U shaped blade coupons forms a portion of adjacent blades.

Special blade formation members are used to position the blade coupon around the perimeter of what will become the rotor body. Adjacent blades formation members form an air foil shape cavity when placed next to each other to form airfoil shaped blades. An airfoil shaped rotor blade is also formed by using axial fibers of varying diameter in the braiding process. The concentration of fibers in a given area also helps achieve the airfoil shape. Adjacent blade formation members may also form a curved cavity and/or twisted cavity when placed next to each other blades with a sweep and/or a twist. Molding operation typically includes a resin transfer molding operation for resin infusion.

This invention also features the product formed by this process, namely a rotor body including a plurality of disks stacked on top of each other and a plurality of rotor blades oriented around the perimeter of the stack of disks, each blade having axial fibers extending therefrom sandwiched between the disks. The disks are typically polar woven plies of fabric and the rotor blade includes a portion of two adjoining U-shaped flat braids. Each flat braid includes axial fibers extending therefrom sandwiched between the disks. In a preferred embodiment, each flat braid includes biased fibers and the blades are formed to have a sweep, and airfoil shape, axial fibers of varying cross sectional area, a variable concentration of axial fibers, and blades with a twist.

This invention also features a unique molding tool for forming a composite turbine rotor. There is a molding tool body, a chamber in the body, and number of rotor blade formation members arranged circumferentially about the body and extending inward into the chamber. Each adjacent pair of formation members form a cavity which receives the rotor blades during forming. The cavity preferably has an airfoil shape, is curved to form a blade with a sweep, and is twisted to form blades with a twist. There is a bottom plate for securing the rotor blade formation members in a circular configuration within a chamber such as the stack of polar woven plies can be placed within the circular cavity formed by the blade formation members. There is a resin port for injecting resin into the chamber, and a vacuum port for drawing a vacuum within a chamber during the resin transfer molding operation.

More generically, this invention features a method of manufacturing a composite component having a body and blades or fins or other structural components extending outward from the body of the composite component. A number of coupons are constructed each having a plurality of fibers extending axially therefrom, the coupons are positioned around the composite body, the stack of plies which will form the composite body are assembled and the extending axial fibers are woven between successive plies in the stack to form a preform. This preform is then molded to form a cured composite component.

The invention also features a composite component including a body having a plurality of plies stacked on top of each other and a plurality of fins oriented around the perimeter of the stack of plies wherein each fin has axial fibers extending and sandwiched between the plies. The molding tooling for manufacturing such a composite component according to this invention has a molding tool body, a chamber in the body, a plurality of fin formation members arranged circumferentially within the body extending inward into the chamber wherein adjacent formation members form a cavity for receiving a fin therein. The cavity is preferably airfoil shaped, curved, and/or twisted.

DISCLOSURE OF PREFERRED EMBODIMENT

Other objects, features and advantages will occur to those skilled in the art from the following description of a preferred embodiment and the accompanying drawings, in which:

FIGS. 5–6 are schematic views showing the formation of the blade coupons used in the rotor preform shown in FIG. 2;

Figure 1:
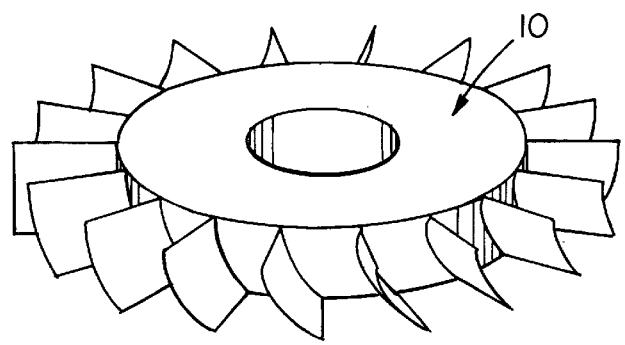
FIG. 1 is a schematic view of a cured composite turbine rotor in accordance with this invention.

Composite rotor 10, FIG. 1, as discussed in the Background of the Invention above, is a light weight and high strength alternative to prior art metal alloy turbine rotors. In accordance with this invention, a number of blade coupons such as blade coupon 15, FIG. 2, are constructed as discussed with reference to FIGS. 4–6 below such that axial fibers 16, 18, 20 and 22 etc. as shown are left extending.

Figure 3:
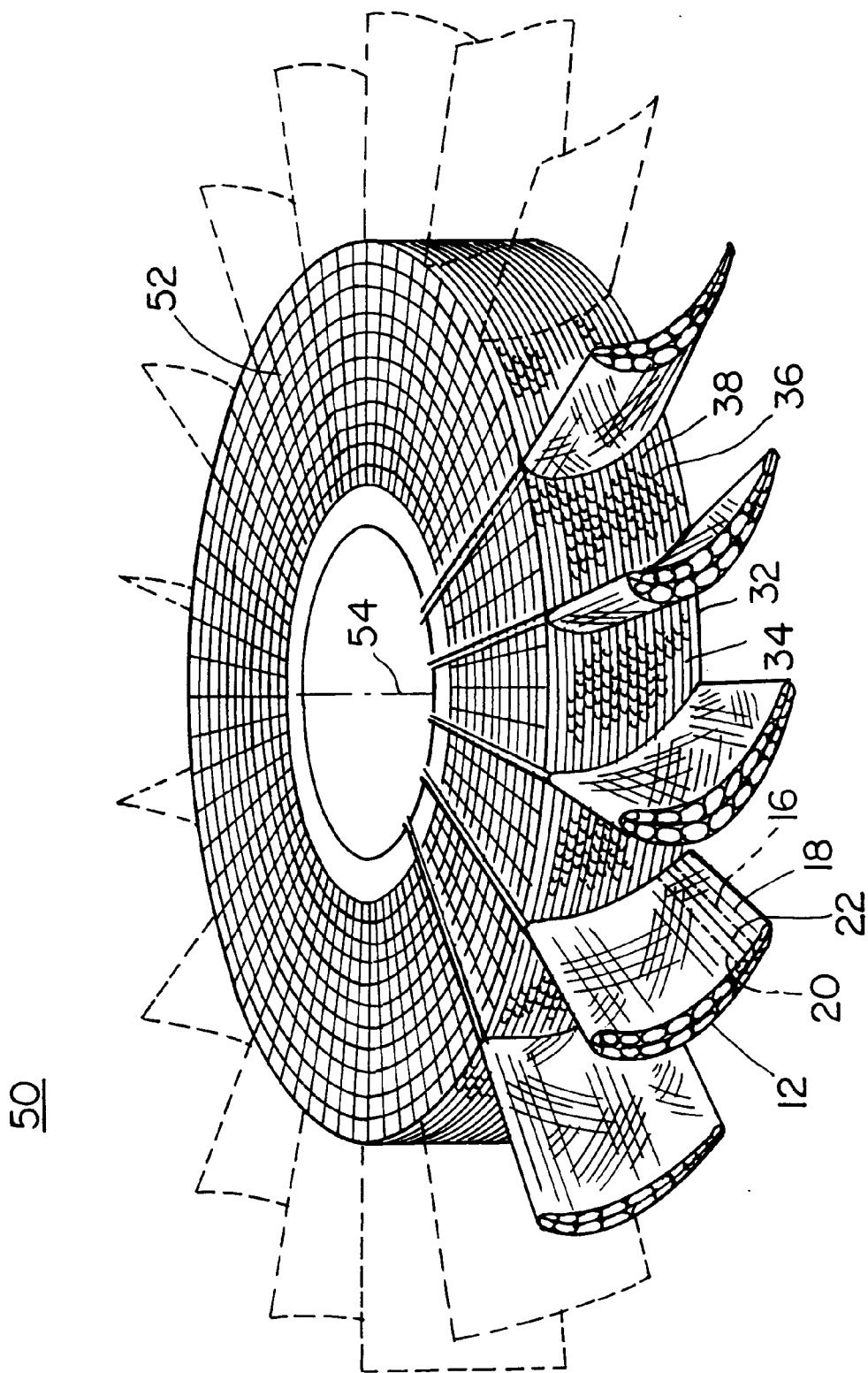
FIG. 3 is a schematic view of preform of a composite turbine rotor manufactured in accordance with this invention.

After a number of such blade coupons are constructed, a plurality of polar woven plies 32, 34, 36, 38 etc. are procured. These piles will form what will eventually become the rotor body. The blade coupons are positioned around the perimeter of stack 30 using blade formation tools, such as tool 13 and the axially extending fibers are alternately woven between successive polar woven plies. For example, fibers 16 and 18, FIG. 3, are woven to extend between plies 36 and 38 with any remaining length passing through hole 40 in the stack as shown. Fiber 20, however, is woven to extend between plies 36 and 38 as shown and so on until all of the plies which make up the thickness of the rotor body are assembled. There may be additional plies (not shown) above and below stack 30 to achieve the correct thickness dimension for the rotor body. The number of axially extending fibers and the weaving technique used will depend on the size of the rotor to be produced. In general, it may be said that the extending fibers of the blade coupons are woven alternately between successive disk plies but it is to be understood that not every set of plies includes an extending fiber therebetween and that the choice of which fibers are placed between which plies depends upon the design of the particular rotor.

The polar woven plies 32, 34, 36, 38 are available from Textile Products Inc. of Anaheim, Calif. The polar woven material is produced as a continuous helical weave with a 4 in. outside diameter. The rotor hub is made up of 4 in. diameter disks which are cut from the continuous weave.

Figure 2:
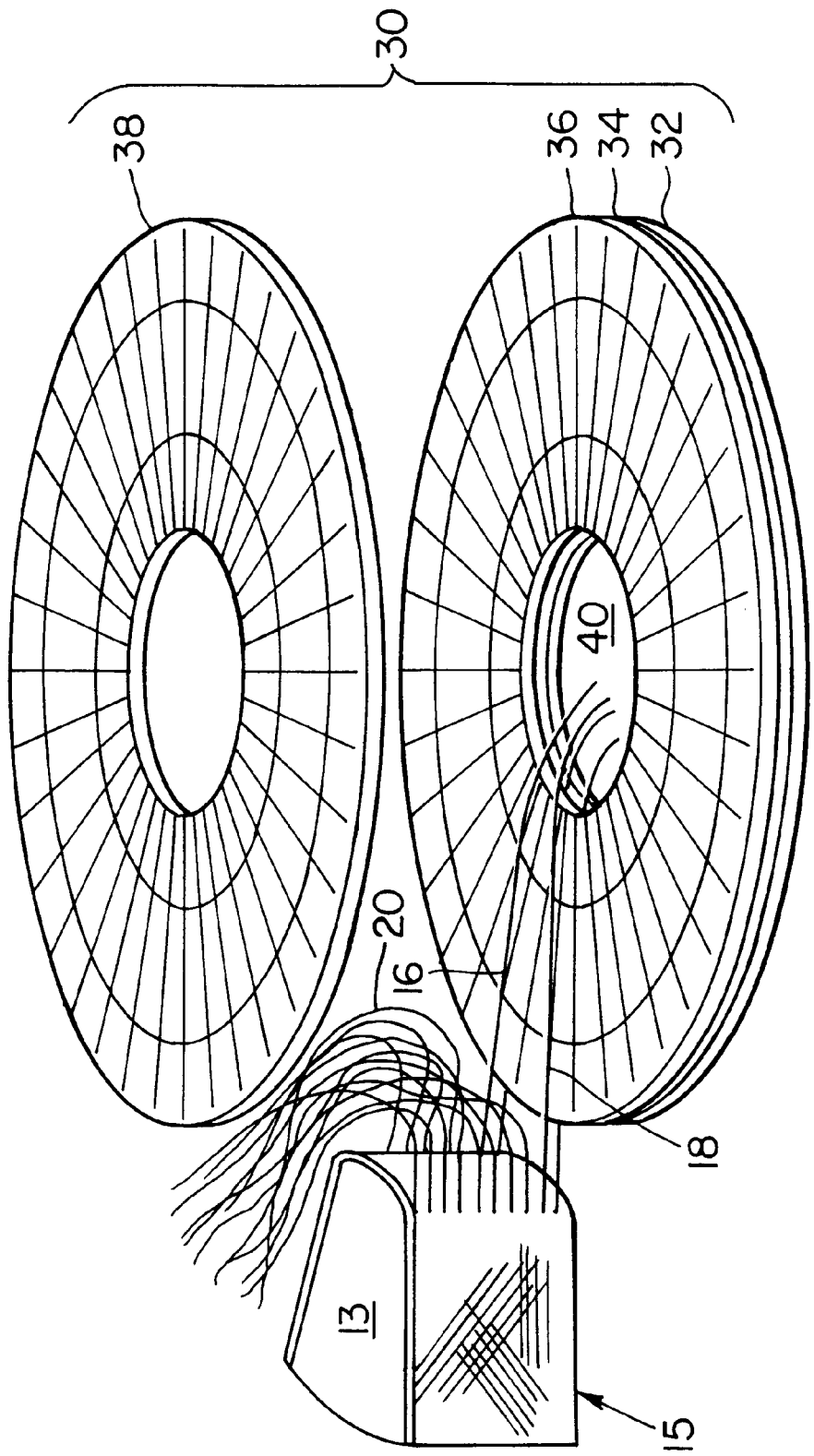
FIG. 2 is an exploded view of the uncured rotor preform in accordance with this invention.

The result is rotor preform 50, FIG. 3, which includes rotor body 52 of dry fabric polar woven plies 32–38, etc. and blades 12, etc. around the perimeter thereof, each U-shaped blade coupon 15, FIG. 2, forming one half of each blade 12 as shown. In order to manufacture a rotor with blades having sweep, fibers 16, 18, 20 and 22 are offset by an increasing amount with respect to vertical axis 54 of the stack of plies as shown in FIG. 3.

Figure 4:
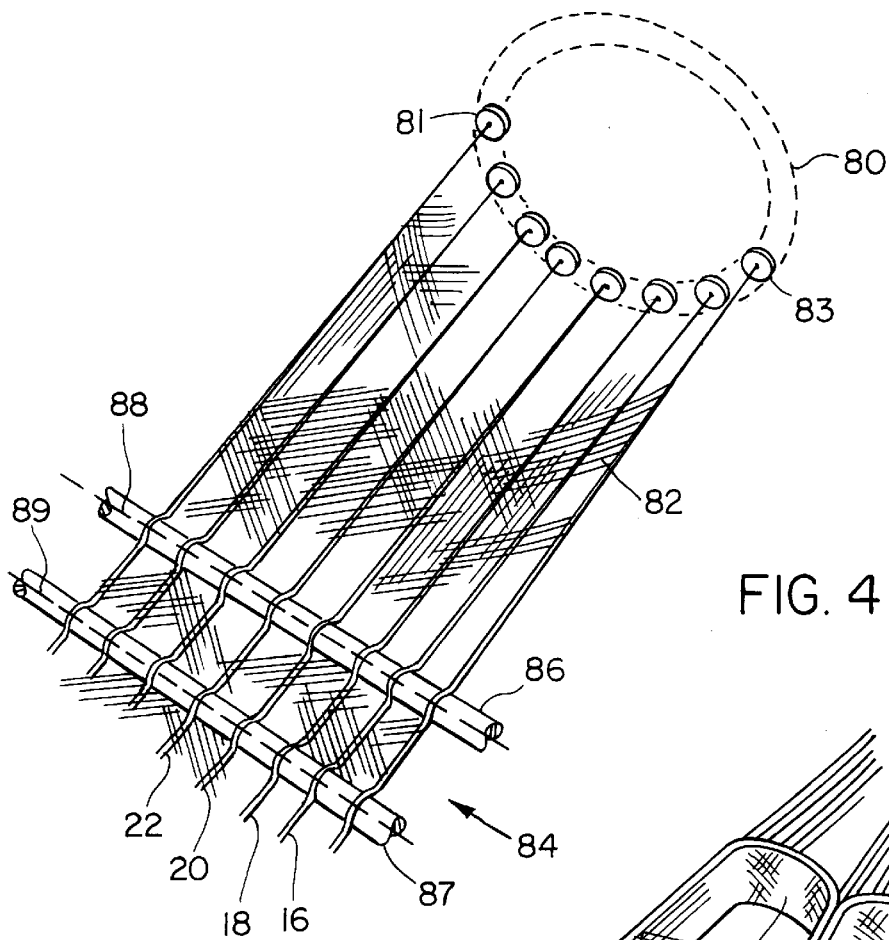
FIG. 4 is a schematic view of the braiding machine used to fabricate the blade coupons used to form the rotor blades in accordance with this invention.

The blade coupons are manufactured on braider 80, FIG. 4. Braider 80 is a New England Butt Braider (Wardwell) model 144, 8' diameter circular braider modified with a "Keliher" gear set. There are twelve gear sets with the Keliher replacement gears at the positions shown at 81 and 83. In this way, 25 biased (e.g. ±45°) fibers and 10 axial fibers are woven to form a flat braid 82. In sections 84 and 85 of flat braid 82, tubes 86 and 87 are inserted underneath axial fibers 16, 18, 20 and 22 to pull them out of the plane of flat braid 82. A cut is then made along lines 88 and 89 through axial fibers 16, 18, 20, and 22. This flat braid is bent to form the U-shaped blade coupon 15 shown in FIG. 2.

Braider 80 is configured to produce a 0.70 in. wide tape. This is accomplished with 21 bias fiber carriers and 10 axial fiber carriers. The bias fiber size is 3K and the axial fiber size ranges from 3K to 18K to form an airfoil shape. T300, AS4, or 1M7, carbon fiber available from Amoco or Hercules may be used to form the blade coupons. Glass or ceramic fibers may also be used.

Blade coupon fabrication begins by braiding 6 in. of tape to make first leg 100, FIG. 5. The braider is stopped, and 8 in. from each axial tow are pulled out from the braider to form the leg's radial fibers as shown at 85. The radial fibers are secured to maintain the integrity of the unbraided tows. Unbraided tows must remain in tension at all times lest they become snarled during braiding. The braider is restarted to form the ½ in. interblade region 103. Another set of axial tows are pulled out and wrapped around the roll for the radials of second leg 102 as shown at 84. Then enough braid is made for the second leg 102 and the first leg of the next tab.

The coupons are completed by cutting loose the radial fibers. The location of the cuts are shown at 88 and 89 in. FIG. 6. A short axial segment is removed from the interblade region. There is no structural need for axials at this location. Once a coupon is complete the axial fibers are labeled and secured and the coupon is stored until needed for fabrication. A total of 35 coupons are fabricated for each rotor.

Figure 7:
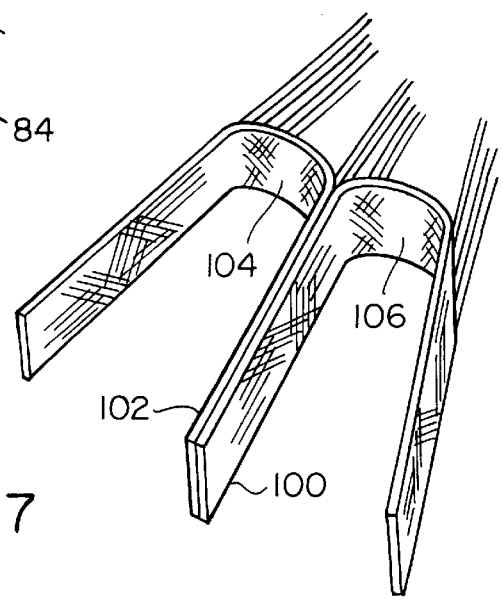
FIG. 7 is a view of the blade coupon fabric after formation in accordance with FIGS. 5–6.

The result is shown in FIG. 7. Leg 100 and leg 102 are bent into the U-shape shown and the joint between them (the combination of legs 100 and 102) will form a single rotor blade 12, FIG. 3. Tool 13, FIG. 2 is placed in area 104, FIG. 7, at the bend of the U-shaped section (also shown in FIG. 2 as coupon 15) and a similar tool is placed in area 106. Areas 104 and 106 from outside surface of the rotor.

Figure 8:
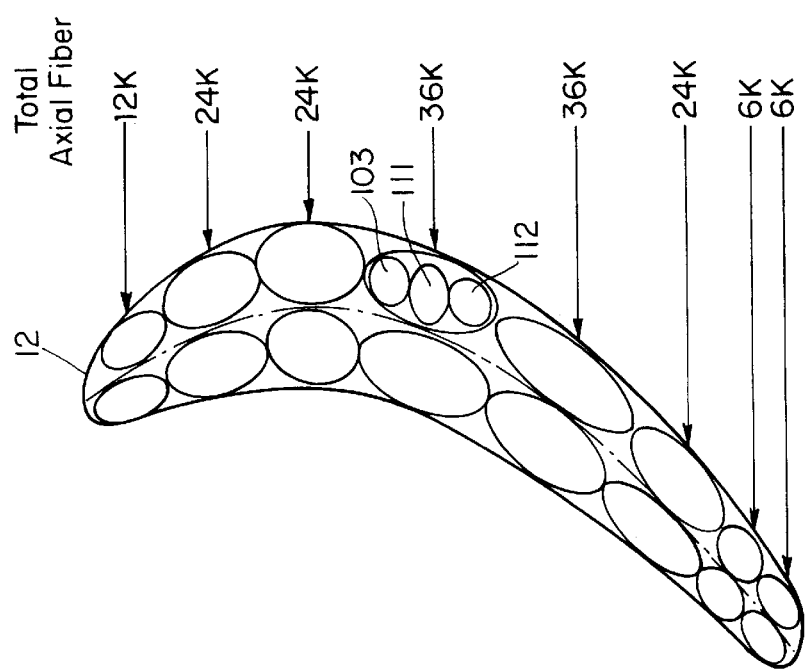
FIG. 8 is a cross-sectional view of a rotor blade having different diameter axial fibers for forming airfoil shaped blades.

As shown in FIG. 8, an airfoil shaped rotor blade 12 is formed by setting up braider 80, FIG. 4, to weave thicker axial fibers in the center of the blade coupons. The 36 K fibers shown are actually three 12 K fibers 110, 111, 112 and the areas showing 12 K fibers are actually two such 12 K fibers.

Figure 9:
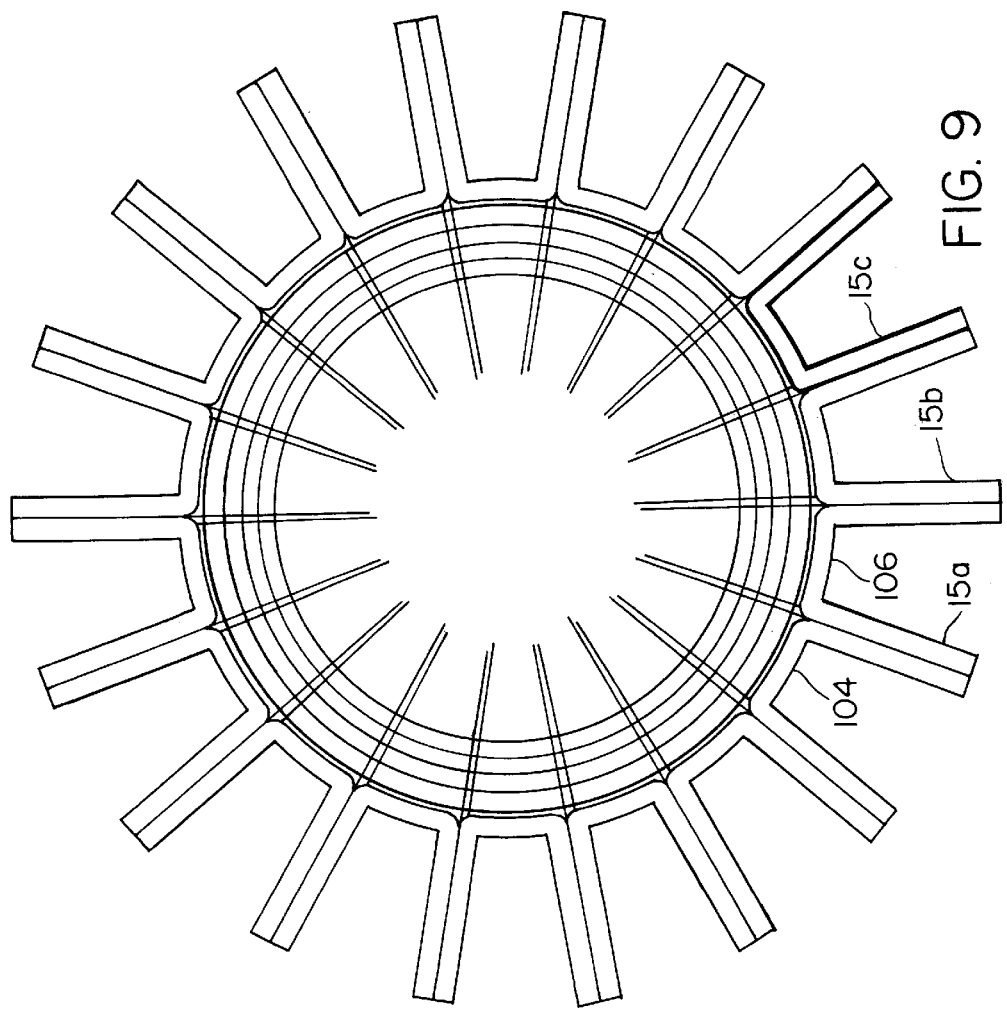
FIG. 9 is a top view of the composite turbine rotor preform of this invention.

The coupons 15a, 15b, and 15c, FIG. 9, are then placed adjacent to each other as shown around the perimeter of what will become the rotor body.

Figure 10:
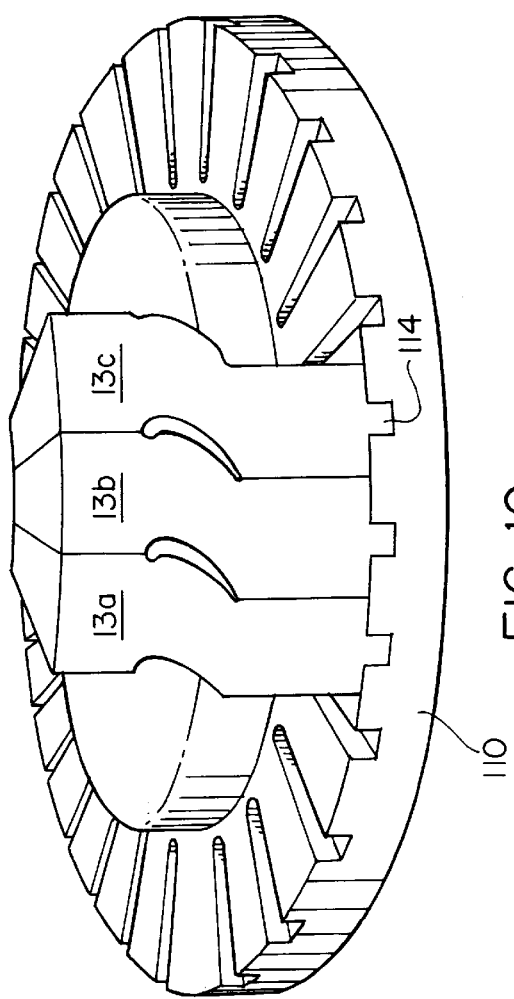
FIGS. 10–11 are three dimensional schematic views of the preform tooling used to fabricate the composite turbine rotor in accordance with this invention.
Figure 11:
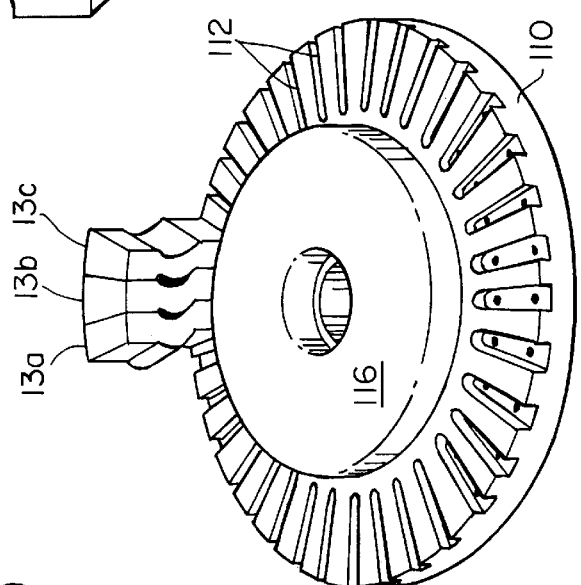

The blade formation tools 13, FIG. 1, are shown in more detail in FIGS. 10–11. each such blade formation tools 13a, 13b and 13c are shown in place on support plate 110. Support plate 110 includes grooves 112 which accept tangs 114 of tools 13. There is a set of bolt holes in each groove as shown and corresponding fastener receptacles in the tangs of each tool 13 (not shown) to secure the tools in place on the support plate.

Figure 12:
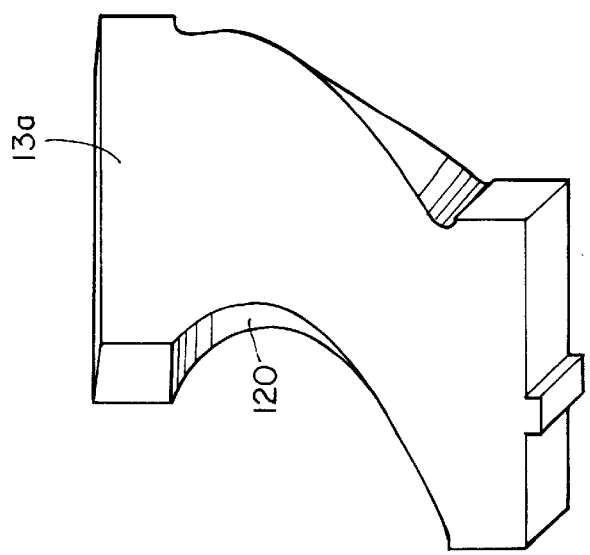
FIG. 12 is a schematic view of a single rotor blade formation tool used to form rotor blades with a twist.

Blade formation tool 13a, FIG. 12, is used to form blades with a twist. Face 120 is curved and twisted as shown such that when two similar tools are placed side by side they form a curved twisted cavity. An 8° twist is typical.

Figure 13:
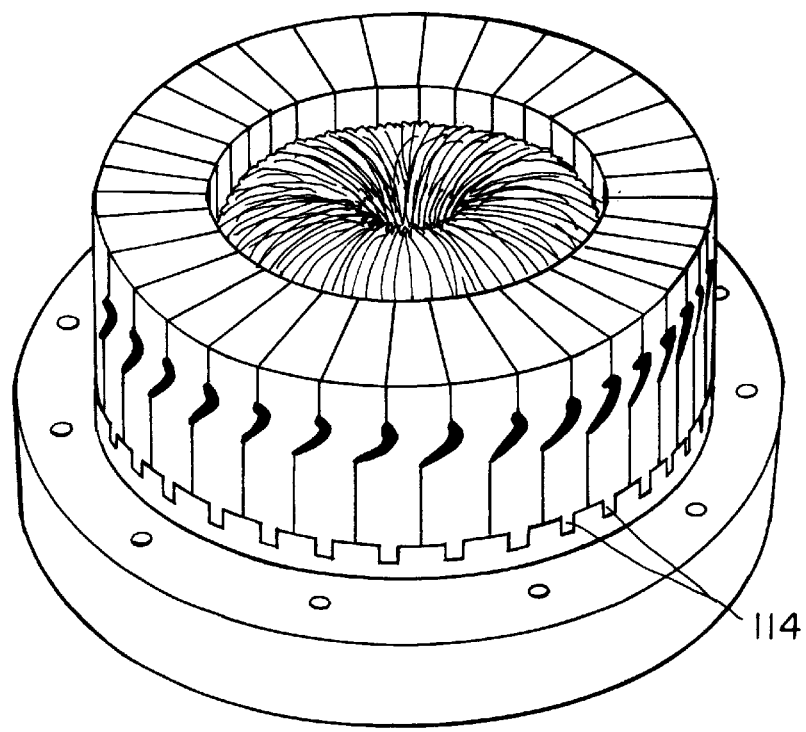
FIGS. 13–14 are schematic views of the composite turbine rotor preform housed within the preform tooling shown in FIGS. 10–11.

The rotor forming sub-assembly is thus composed of 35 such blade tools fitted together on the slotted support plate 110, FIG. 13. The blade tools are fixed in position by the support plate 114 and tool stop 116, FIG. 11. Two bolts hold the blade tools firmly in place.

Figure 14:
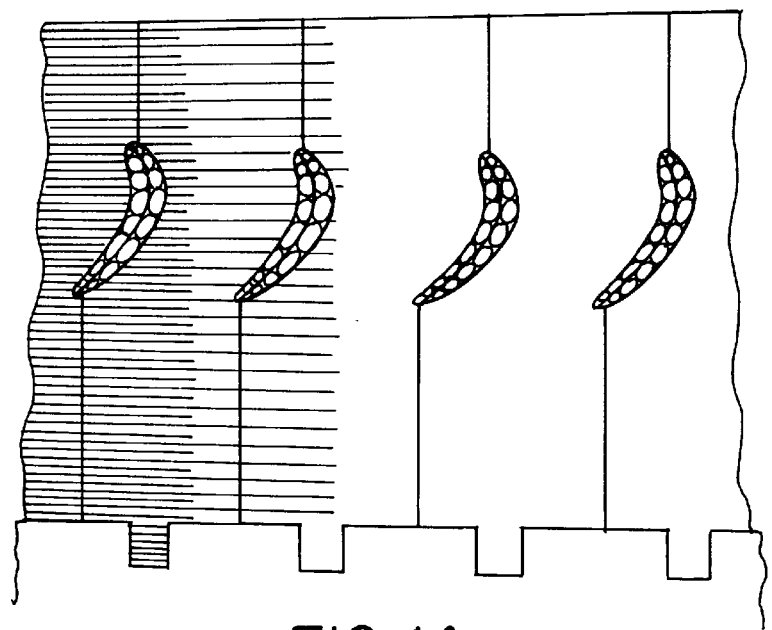
Figure 15:
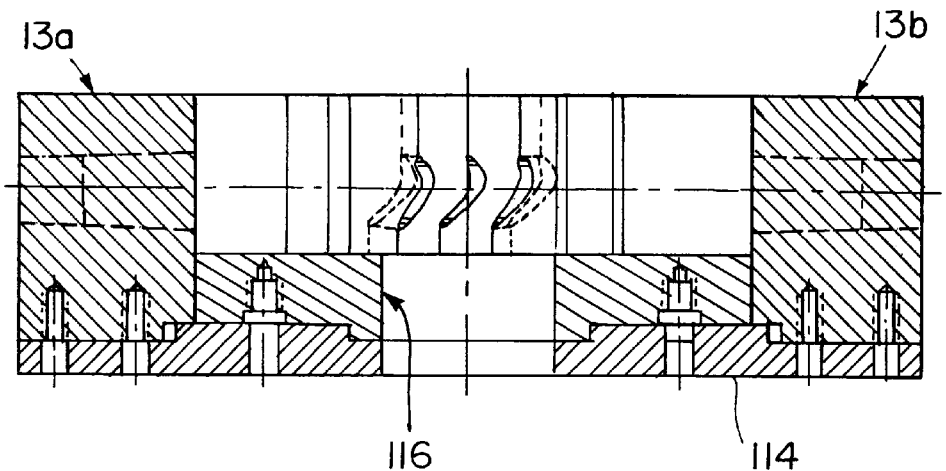
FIGS. 15–17 are cross-sectional views of the preform tooling shown in FIGS. 13–14 disposed within the resin transfer molding housing used in conjunction with a resin transfer molding apparatus used in this invention.

Each blade tool is a single piece. The single piece design is important to simplify assembly and to facilitate removal of the tool from the finished cured part. The blade tools form the mold cavity of the blade when fitted together as shown in FIG. 13. The inside surface of the fitted tools form the outside perimeter of the rotor hub. All surfaces of the blade tools are finely machined to produce an aerodynamic finish on the final product. FIG. 14 shows the blade coupons in place between the cavity formed by each adjacent pair of blade formation tools. The braid coupon material completely fills the space between adjacent blade formation members. FIG. 13 shows the axial fibers of each blade coupon extending into the center of the assembly. FIG. 15 shows the bolts used for holding the blade tools in place on support plate 114.

Figure 16:
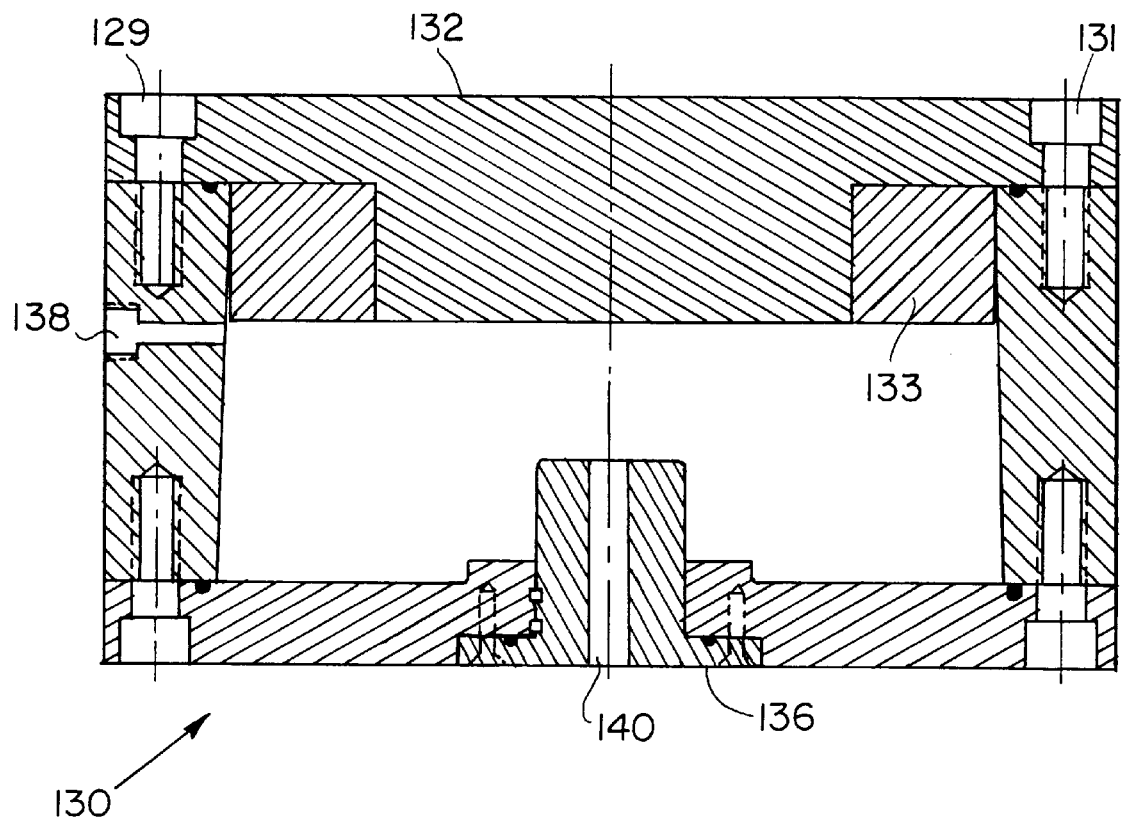

Outer housing 130, FIG. 16, serves as a pressure vessel for the resin transfer molding (RTM) process. The blade forming assembly fits inside housing 130, during the molding process. Housing 130 is sealed with three O-rings located at the plunger 132, cap 134, FIG. 17, and plug 136. A vacuum is drawn through the center of the mold via vacuum port 140 and resin is supplied through port 138 in the side of the housing.

Plunger 132 compresses the polar woven materials in the hub to their final state and molds the top surface of the rotor since the polar woven material will lose 30 percent of its thickness when compressed in the mold during the RTM process. This is somewhat undesirable since it will cause shifting of the radial blade fibers.

A resin binder may be used to maintain compaction. The binder is prepared by B-staging and then grinding it into a powder. First, liquid resin is placed in an oven and heated to 320° for 20 min. This partially cures the liquid resin into a tacky solid. This B-staged resin is then embrittled in a freezer and pulverized to a fine powder. When heated again to 250° F. the powder will flow as a liquid.

The compaction process employs the plunger 132 and spacer 133 components, FIG. 16, of the RTM tool. A press is used to apply pressure and heat for the process. Typically, several two- or four-ply stacks of polar woven disks are made at once. The plies are placed in the cavity formed by the base of the press and the spacer. Two grams of B-staged resin powder are sprinkled between the plies. The plunger is placed on top and 80 psi pressure is applied with the press platen. The press is heated to 250° F. which along with the pressure forces the resin into the fibers. Once cooled the consolidated stacks are removed.

In a preferred embodiment, turbine rotor fabrication begins by assembling the braided tabs and blade tools to form the outside of the rotor. One blade is made at a time by positioning the legs of neighboring tabs into the blade mold cavity. When the tab legs are in position the subsequent blade formation tool is put into place and bolted into position. This sequence is continuous until all of the tabs are in place to form the blades.

A stack of 11 consolidated polar woven plies is placed into the hub cavity to form the outside surface. The first set of axials is drawn over this stack and through the center. Then, subsequent layers of polar woven and axial sets are layered in to form the blade region of the hub. The polar woven ply stacks used in the blade region are not preconsolidated. Preconsolidated plies are too stiff to work into the tooling. Bulk from this region is pressed out as the final step of rotor fabrication.

FIG. 13 shows the preform laid into the rotor forming assembly. The top layer of polar woven has yet to be laid in. The top radial fiber set can be seen emanating from the blades through the hub. FIG. 14 shows an edge view of the blade formation tools completely filled with the braided material. Next the assembly is placed into the housing 130, FIG. 16. The remaining polar woven plies are placed on top. Plunger 132 is put into position and the bolts 129 and 131 tightened. As the plunger is drawn down to compress the hub, hand tension is applied to the radial fibers to remove any slack created by the compaction. The plunger is tightened to seal the housing. Plug 136 is put in place and the mold is now ready for the RTM process.

The RTM process may include chemical vapor infiltration (CIV), polymeric ceramic precursor infusion/pyrolysis, C/C fabrication techniques, and pressure casting of molten metal. The only major difference would be the materials for tooling. For example, graphite tooling would probably be most suitable for CVI processing.

The epoxy system of choice was 3M's Scotchply "PR500". There are several reasons for its selection over other potential systems. First, it has a very low viscosity (25 to 50 cPs) at the processing temperature. Second, the resin requires no mixing or metering before or during use. Third, the resin is widely accepted in the aerospace industry because of its excellent dry and hot/wet mechanical and thermal properties.

Figure 18:
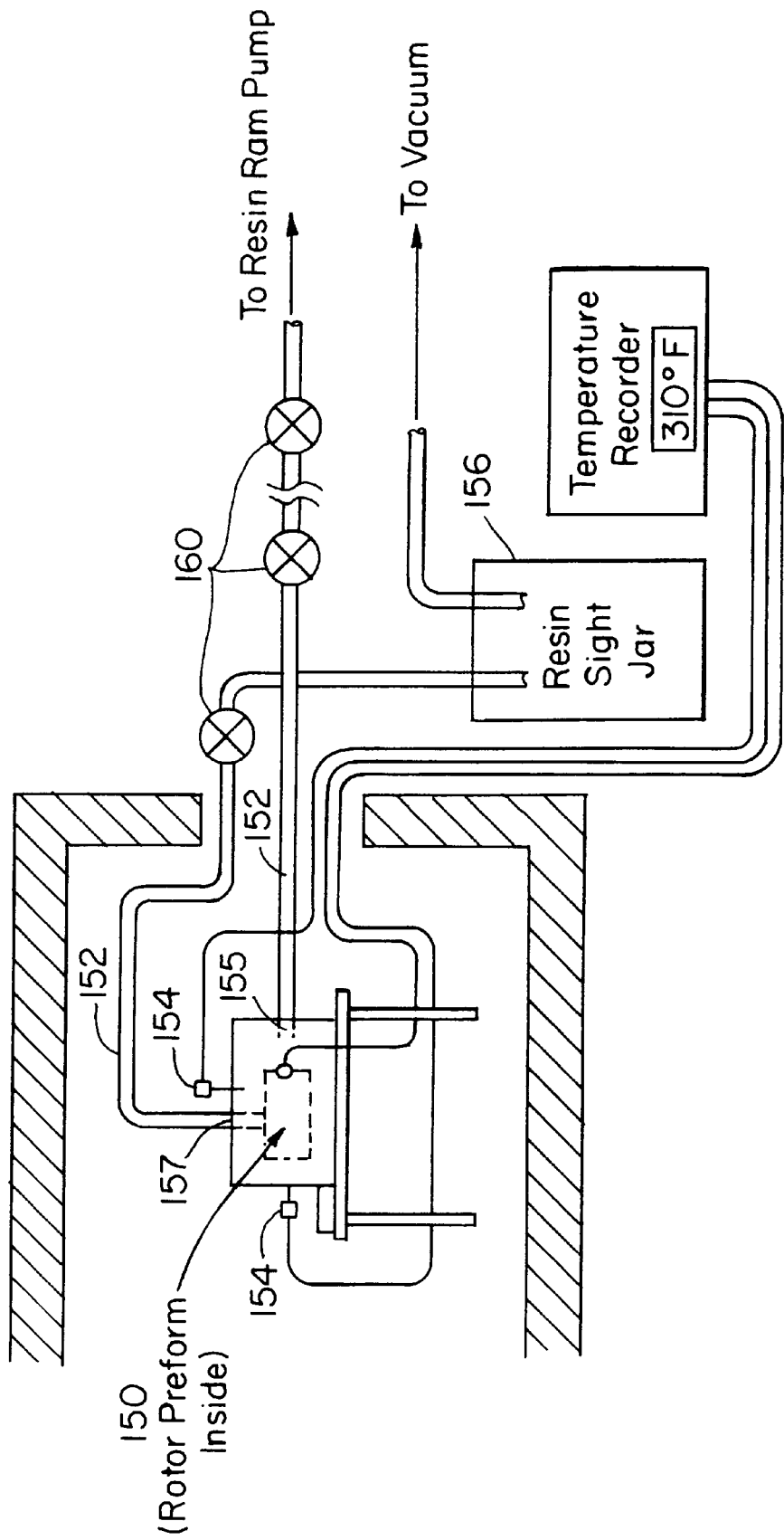
FIG. 18 is a block diagram showing the major components of the resin transfer molding apparatus used to form the rotor preform of this invention.

With the preform complete and the resin chosen, the tool loaded with the preform is placed into a computer controlled, programmable oven 150, FIG. 18, capable of maintaining 400° F. Copper tubing 152 is attached to the RTM tool at the resin inlet 155 and outlet ports 157. In addition, thermocouples 154 and resin sight glass 156 are also fitted to their appropriate positions.

The resin inlet and outlet tubes 152 are heated and maintained within oven 150 to temperatures between 250° and 260° F. during injection. The tool is heated and maintained between 310° to 315° F. During the heating and resin injection process, a vacuum ($\geq$22 in. Hg) is maintained on the preform to remove any volatile by-products from the breakdown of the fiber sizing and to remove air and moisture from the bulk preform. Once the tool, inlet, and outlet tubes are at thermal equilibrium, resin is slowly introduced into the tool at an approximate rate of 20 ml./min. requiring about 30 psi pressure. After 10 min. resin will began to appear in the exit port sight glass 156. Exit valve 160 is then closed and resin is continually pumped into the mold to continue filling. After 2 minutes, exit valve 160 is reopened for 5 to 10 seconds to bleed any gas from the mold. Exit valve 160 is then closed again and the process repeated every 2 minutes for an additional 10 minutes. After the second bleed step is completed, the vacuum is disconnected from the mold since it is no longer required. The pressure required to introduce more resin into the tool will begin to rapidly rise from 120 psi to 200 psi indicating the mold is essentially filled. The fifth bleed cycle removes the last bit of air and gas from the mold. Once the value is closed, the pressure will rise very rapidly to a value between 200 to 240 psi within two strokes of the pump ram (less than 2 ml of resin). The mold is now filled and heated to the final cure temperature 350°–360° F.).

Slight differences in the resin processing/injection parameters may be used to fabricate the rotors. Resin flow rates of approximately 20 ml/min. and a pressure of 30 psi may be used for the first 5 minutes of the injection, 40 ml for the next 5 minutes and 60 ml for the remainder of the filling time. The total time from the commencement of resin injection to first sighting in the exit port sight glass is then roughly 15 minutes. The rotors are heated at 350 to 360° F. for 2 hr. Cool down for part removal was 3° F./min. until 170° F. was reached. At this temperature the mold is removed from the oven and disassembled.

A spin test is conducted to demonstrate the structural performance of the blade structure. A rotor thus fabricated was spun to a speed of 75,000 rpm with no indication of failure. No cracks were observed by visual inspection and the epoxy rich regions on the trailing edges of the blades remained intact. This test demonstrated the suitability of the rotor fiber structure and the soundness of the manufacturing approach.

The text was conducted in steps of 10,000 rpm increments. The rotor was held at speed for 1 min. then brought to zero for visual inspection. A resonance mode was encountered during the attempt to bring the rotor to 80,000 rpm.

Figure 17:
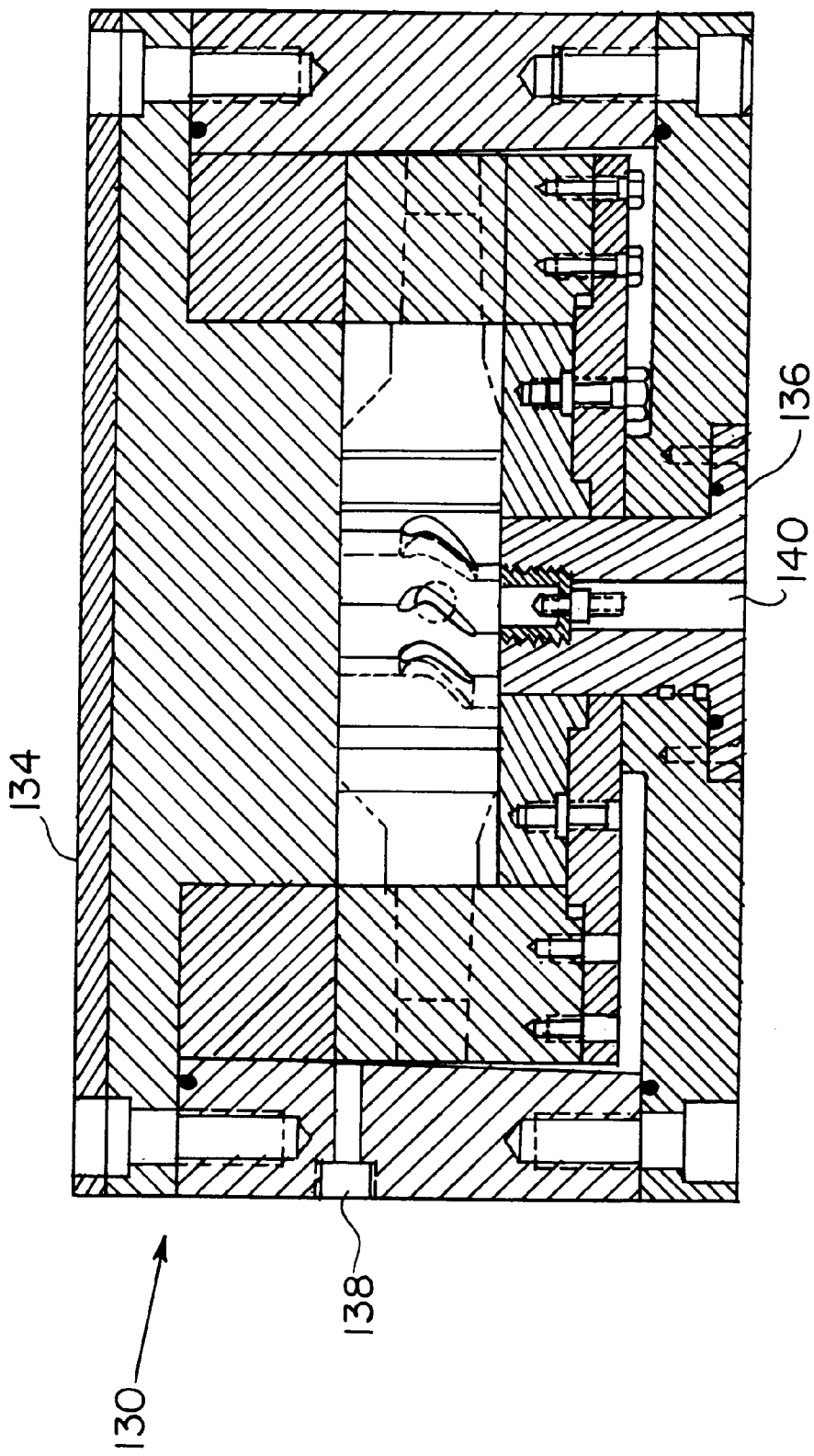
Figure 19:
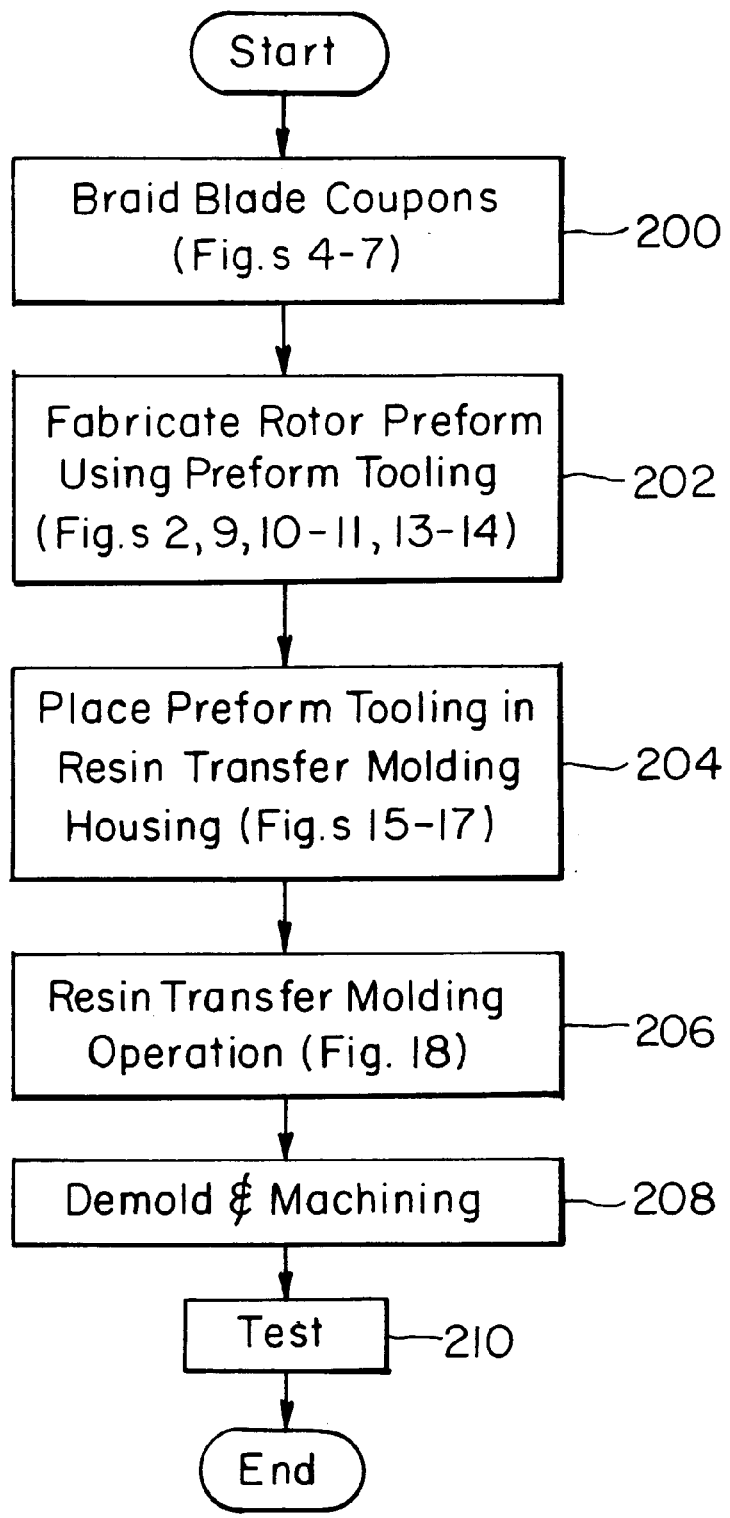
FIG. 19 is a flow chart depicting the primary steps in fabricating the composite turbine rotor in accordance with this invention.

In summary, a number of triaxial braided blade coupons are manufactured as shown with respect to FIGS. 4–7, step 200, FIG. 19. The rotor preform is there fabricated as shown with respect to FIGS. 2, 9, 10–11 and 13–14 using the tooling described above, step 202, FIG. 19. This preform assembly is then placed in the outer ring of molding tool housing as shown in FIGS. 15–17, step 204, FIG. 19. This molding tool is then connected to resin transfer molding system 74, FIG. 5, step 106, FIG. 7, for resin transfer molding, (liquid or vapor infusion) step 208, to be followed by demolding and touch machining, step 110, and balancing by spin testing or other mechanical tests, step 210.

Although specific features of the invention are shown in some drawings and not others, this is for convenience only as some feature may be combined with any or all of the other features in accordance with the invention. For example, the manufacturing technique described above could be employed with components other than rotors; generically any body having blades or fins and including rotors used for devices other than turbines. Other embodiments will occur to those skilled in the art and are within the following claims:

What is claimed is:

1. A composite component comprising:
    a body including a plurality of plies stacked on top of each other; and
    a plurality of braided fins orientated around the perimeter of said stack of plies, each said fin having axial fibers extending therefrom and interleaved between the different pairs of plies in the body.

2. A method of manufacturing a composite component, the method comprising;
    constructing a number of coupons, each said coupon having a plurality of fibers extending therefrom;
    positioning said coupons around the composite component body;
    assembling a stack of plies which will form the composite component body;
    weaving said extending fibers between successive plies in the stack to form a preform; and
    molding the preform to form a cured composite component.

3. A composite turbine rotor comprising:
    a rotor body including a plurality of disks stacked on top of each other; and
    a plurality of braided rotor blades oriented around the perimeter of said stack of disks, each said braided blade including a portion of two adjoining u-shaped flat braids, each flat braid including axial fibers extending there from sandwiched between the disks of the rotor body.

4. A method of manufacturing a composite turbine rotor, the method comprising;
    constructing a number of blade coupons, each said blade coupon having a plurality of fibers extending therefrom;
    positioning said blade coupons to form the rotor blades;
    assembling a stack of plies which will form the rotor body;
    weaving said extending fibers between successive plies in the stack to form a rotor preform; and
    molding the preform to form a cured composite turbine rotor.

5. The method of claim 4 in which weaving includes offsetting the extending fibers of each blade coupon with respect to the vertical axis of the stack of plies to form a blade with a sweep.

6. The method of claim 4 in which constructing includes weaving axial and biased fibers to form a flat braid having one section thereof with axial fibers raised out of the plane of the braid, the method further including cutting said raised axial fibers.

7. The method of claim 6 further including bending said flat braid into a U-shaped blade coupon.

8. The method of claim 7 in which positioning said blade coupons includes placing said U-shaped blade coupons adjacent to each other around the perimeter of the rotor body, each U-shaped blade coupon forming a portion of two spaced rotor blades.

9. The method of claim 4 in which positioning the blade coupons includes using blade formation members.

10. The method of claim 9 in which two adjacent blade formation members form an airfoil shaped cavity when placed next to each other to form airfoil shaped blades.

11. The method of claim 9 in which two adjacent blade formation members form a curved cavity when placed next to each other to form blades with a sweep.

12. The method of claim 9 in which two adjacent blade formation members form a twisted cavity when placed next to each other to form blades with a twist.

13. The method of claim 9 in which molding further includes infusing said preform with a matrix material by an infusion process.

14. The method of claim 4 in which constructing includes forming a flat braid with axial fibers of varying diameter to form an airfoil shaped rotor blade.

15. The method of claim 4 in which constructing includes forming a flat braid having a varying concentration of axial fibers.

16. The product formed by the process of claim 4.

17. A composite turbine rotor comprising:

a rotor body including a plurality of disks stacked on top of each other; and a plurality of rotor blades orientated around the perimeter of said stack of disks; each said braided rotor blade having axial fibers extending therefrom and interleaved between the difference pairs of disks in the rotor body.

18. The composite turbine rotor of claim 17 in which said disks include polar woven plies of fabric.

19. The composite turbine rotor of claim 17 in which each said rotor blade includes a portion of two adjoining U-shaped flat braids.

20. The composite turbine rotor of claim 19 in which each said flat braid includes axial fibers extending therefrom sandwiched between said disks.

21. The composite turbine rotor of claim 19 in which each said flat braid further includes biased fibers.

22. The composite turbine rotor of claim 17 in which said blades have a sweep.

23. The composite turbine rotor of claim 17 in which said blades have an airfoil shape.

24. The composite turbine rotor of claim 23 which said airfoil shaped blades have axial fibers of varying cross sectional area.

25. The composite turbine rotor of claim 23 in which said airfoil shaped blades have a variable concentration of axial fibers.

26. The composite turbine rotor of claim 17 in which said blades have a twist.

* * * * *